E. R. HILL.
PANTOGRAPH GROUNDING CIRCUITS FOR ELECTRIC RAILWAY VEHICLES.
APPLICATION FILED APR. 3, 1915.
1,142,881.
Patented June 15, 1915.
2 SHEETS—SHEET 1.
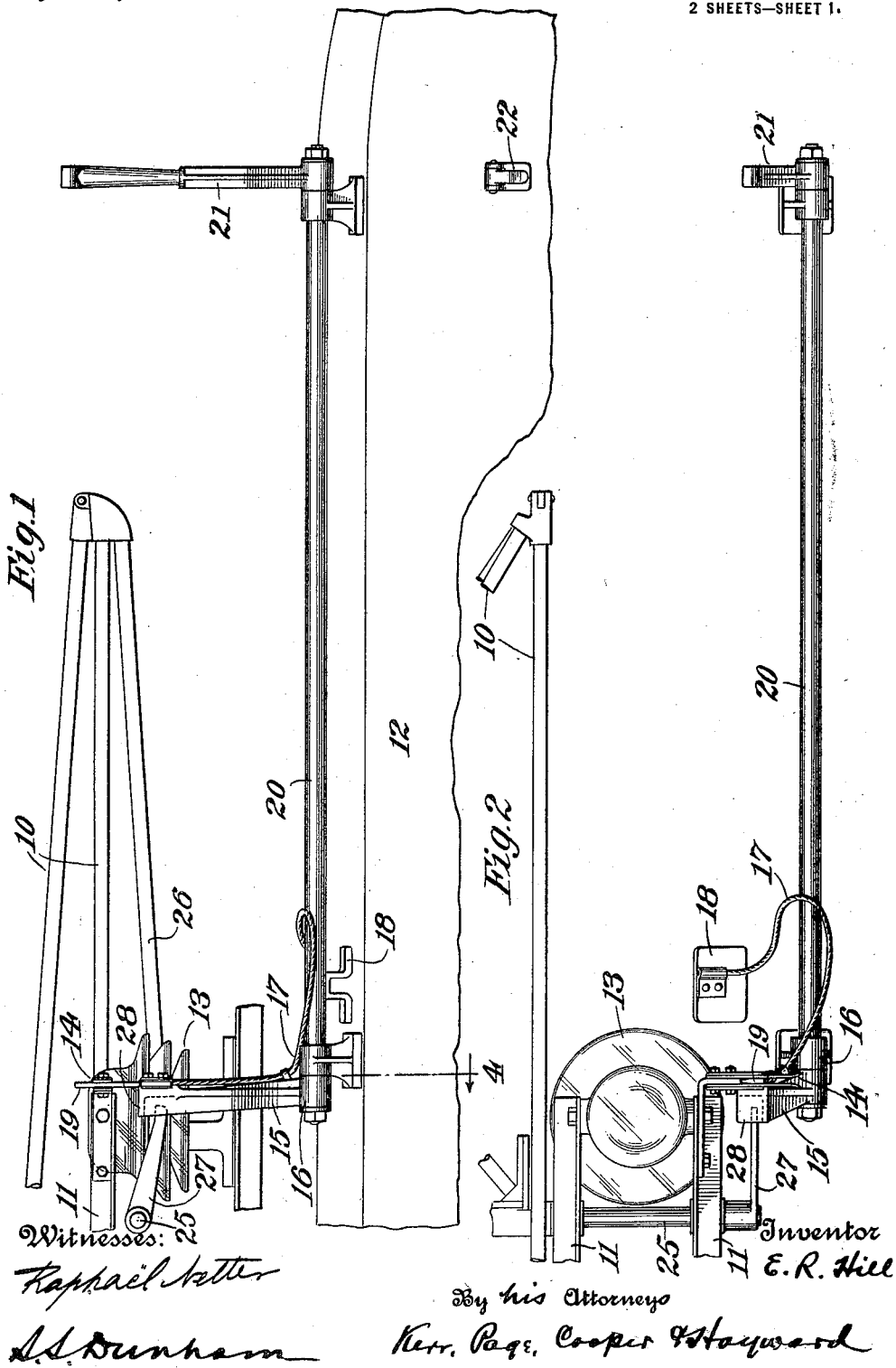

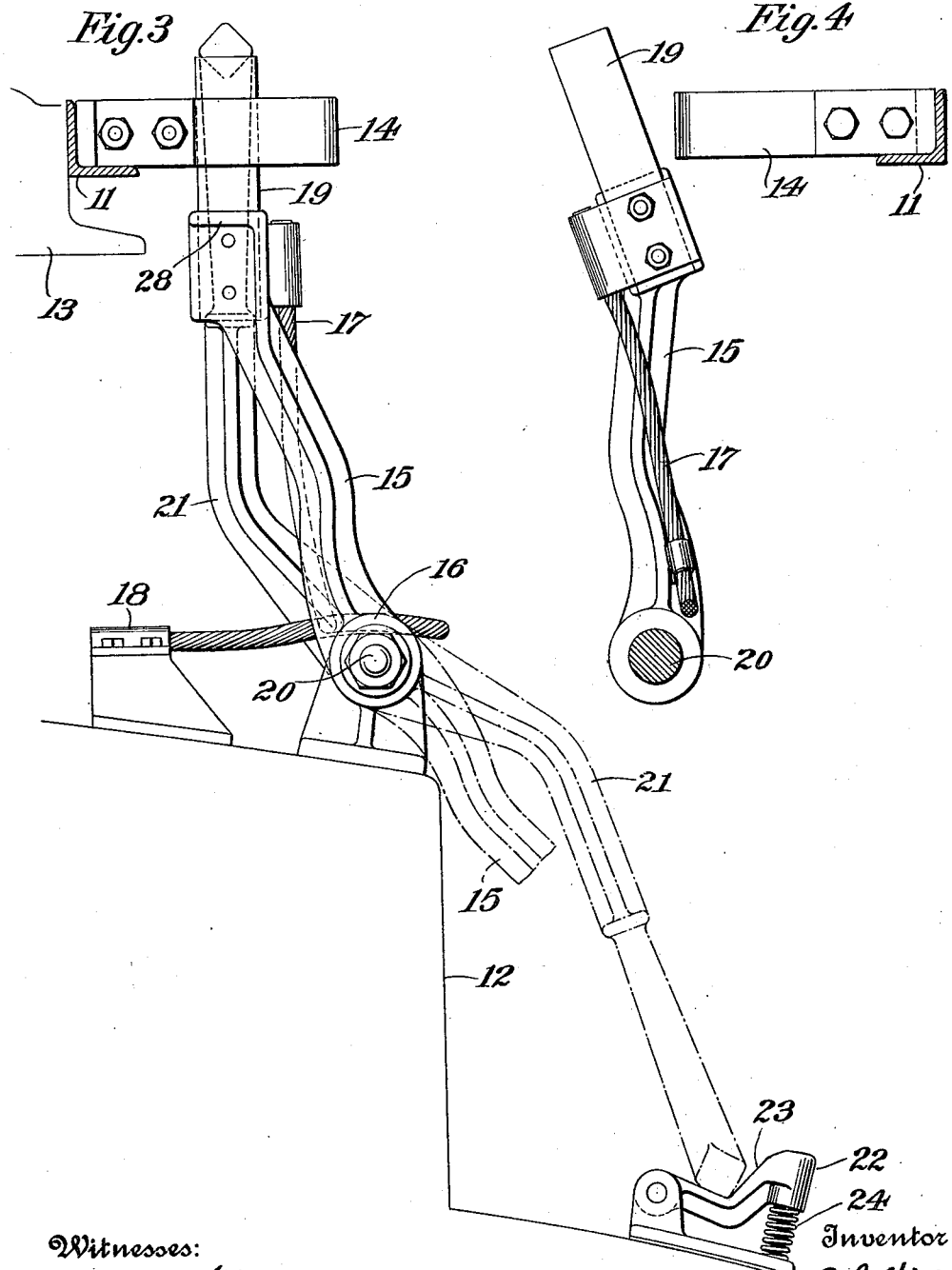

UNITED STATES PATENT OFFICE.

ERNEST ROWLAND HILL, OF EAST ORANGE, NEW JERSEY.

PANTOGRAPH-GROUNDING CIRCUITS FOR ELECTRIC RAILWAY-VEHICLES.

1,142,881.  Specification of Letters Patent.  Patented June 15, 1915.

Application filed April 3, 1915. Serial No. 19,025.

*To all whom it may concern:*

Be it known that I, ERNEST ROWLAND HILL, a citizen of the United States, residing at East Orange, in the county of Essex and State of New Jersey, have invented certain new and useful Improvements in Pantograph-Grounding Circuits for Electric Railway-Vehicles, of which the following is a full, clear, and exact description.

This invention relates to the grounding of parts of electrical apparatus, such as trolley or pantograph bases on the roofs of electric locomotives and cars. The parts referred to are presumably dead, but being in close association with members carrying heavy currents they may become live, with consequent danger to persons engaged in making adjustments or repairs while the current is flowing. To eliminate this possibility I provide means, preferably operated by hand, whereby the workman can connect the supposedly dead part or parts to ground, so that if he should come in contact with such a part he would suffer no injury should such part be live.

To this and other ends the invention consists in the novel features of construction and combinations of elements hereinafter described.

One form of the invention is illustrated in the accompanying drawings, in which—

Figure 1 is a side view of the apparatus installed on the roof of a car, showing part of the pantograph and part of the car roof. Fig. 2 is a plan view of the same, omitting the car roof. Fig. 3 is an end view on a larger scale, from the left of Fig. 1. Fig. 4 is a detail section about on line 4 of Fig. 1.

The contact device (not shown) which moves along the trolley wire and takes current therefrom is carried by the usual pantograph 10 or other structure, having a base 11 mounted on suitable insulating devices on the car roof 12, one such insulating device being shown at 13. It will of course be understood that a suitable conductor, not shown, is provided to carry current from the insulated pantograph to the motors and other electrical apparatus of the car.

When a workman mounts to the roof the pantograph is of course in collapsed or down position with the contact out of engagement with the trolley wire, so that no harm can happen to the workman, but if for any cause the pantograph should rise, as by reason of failure of the lock which is supposed to hold it down, the results might be disastrous. To prevent such results I provide a circuit-closer comprising spring contact-jaws 14 on a suitable part of the apparatus, as for example the pantograph base 11, and an arm 15 fulcrumed at 16 on the upper deck of the car roof and connected by a flexible cable 17 to a terminal 18 welded or otherwise properly connected to a metal part of the car which is in circuit with the rails, for instance the roof. The arm carries a blade 19 adapted to enter the jaws 14, thereby connecting the pantograph to the metallic framework of the car and thus to the rails or ground. The arm is operated by a rock shaft 20 extending toward the end of the car, where the steps (not shown) by which the car roof is reached are usually located. On this end of the shaft is an operating handle 21. Normally the handle and the switch-arm 15 are down, as shown in dotted lines in Fig. 3, and are locked by a bent finger 22 pivoted on the lower deck of the car roof and having an inclined edge 23 in the path of the end of the handle. A coil spring 24 holds the finger yieldingly but firmly against the handle.

It is intended that when a workman mounts to the roof of the car he shall first throw the handle 21 upward through a considerable angle, thereby bringing the switch-arm 15—19 into coöperation with the jaws 14 on the base of the collapsed pantograph. He is now safe from injury by contact with the pantograph or any part thereof, for if by inadvertence or accident the pantograph should be permitted to rise into contact with the live trolley wire the current therefrom will for the greater part flow through the low-resistance path afforded by the switch arm 15—19 and cable 17 to ground instead of through the path of higher resistance afforded by the workman's body. Any current taking the latter path will be too light to cause any real injury though the results may be momentarily unpleasant. As a further precaution the switch-arm can be utilized to lock the pantograph in depressed position so that it cannot rise until the workman himself opens the ground circuit by restoring the handle 21 to its initial position as he leaves the car roof. For this purpose the shaft 25, Figs. 1 and 2, to which the adjacent lower members 26 of the pantograph are fixed, and which must rock counter-clockwise (as viewed in Fig. 1) as the pantograph rises, is provided with a locking finger 27 extending toward the switch jaws 14. On the side next to this finger the switch-arm 15 is formed at its end with a flange or lip 28. When the grounding circuit is closed, as in Figs. 1 and 2, this flange or lip 27 overhangs the end of the locking finger 27, so as to positively prevent upward movement of the finger until the locking flange or lip is withdrawn by opening the grounding circuit.

It is to be understood that the invention is not limited to the specific apparatus herein illustrated but can be embodied in other forms without departure from its spirit.

I claim:—

1. In an electric railway vehicle, the combination of a support for a trolley-contact, a grounding circuit connected with said support, a normally open circuit-closer in said circuit, and means for actuating the circuit closer.

2. In an electric railway vehicle, the combination of a depressible support for a trolley-contact, a normally open grounding circuit for the said support, and means for closing the grounding circuit when the said support is depressed.

3. In an electric railway vehicle, a combination of a depressible support for a trolley contact, a grounding circuit for the said support, a movable member in said circuit to open and close the same, and means connected with the said support and coöperating with the movable member to lock the former in depressed position when the grounding circuit is closed.

4. In an electric railway vehicle, the combination of a support for a trolley-contact, a grounding circuit for said support, a movable switch-arm in said circuit to open and close the same, and manual means to actuate the switch arm.

5. In an electric railway vehicle, the combination of a support for a trolley-contact, a grounding circuit connected with said support, a pivoted switch-arm in said circuit to open and close the same, a rock-shaft connected with the switch-arm to actuate the same, and manual means to rock said shaft.

6. In an electric railway vehicle, the combination of a pantograph on the roof of the vehicle for supporting a trolley-contact, a grounding circuit for the pantograph, a pivoted knife-switch on the roof of the vehicle to open and close the grounding circuit, a rock-shaft connected with the knife switch to actuate the same and extending to the end of the roof, and an operating handle on the rock-shaft at the end of the roof.

7. In an electric railway vehicle, the combination of a support for a trolley-contact, a grounding circuit for said support, a normally open circuit-closer in said circuit, and means for locking the circuit-closer in open position.

8. In an electric railway vehicle, the combination of a collapsible and expansible pantograph for supporting a trolley-contact, a grounding circuit for the pantograph, a movable switch-arm in said circuit to open and close the same, a locking device connected with the pantograph and movable with the pantograph in the collapsing and expanding movements thereof, and means carried by the said switch arm to lock said device against movement when the pantograph is collapsed and the grounding circuit closed.

In testimony whereof I affix my signature.

ERNEST ROWLAND HILL.

Copies of this patent may be obtained for five cents each, by addressing the "Commissioner of Patents, Washington, D. C."